(No Model.)

J. R. DOOLITTLE.
SCREW DRIVER.

No. 339,277.  Patented Apr. 6, 1886.

Witnesses:
J. Edward Ludington
George P. Salisbury

Inventor
Joseph R. Doolittle
by George Terry Atty

UNITED STATES PATENT OFFICE.

JOSEPH R. DOOLITTLE, OF SOUTHINGTON, CONNECTICUT.

SCREW-DRIVER.

SPECIFICATION forming part of Letters Patent No. 339,277, dated April 6, 1886.

Application filed December 18, 1885. Serial No. 186,059. (No model.)

*To all whom it may concern:*

Be it known that I, JOSEPH R. DOOLITTLE, a citizen of the United States, residing at Southington, in the county of Hartford and State of Connecticut, have invented certain new and useful Improvements in Screw-Drivers, of which the following is a specification, reference being had therein to the accompanying drawings, in which—

Figure 1:
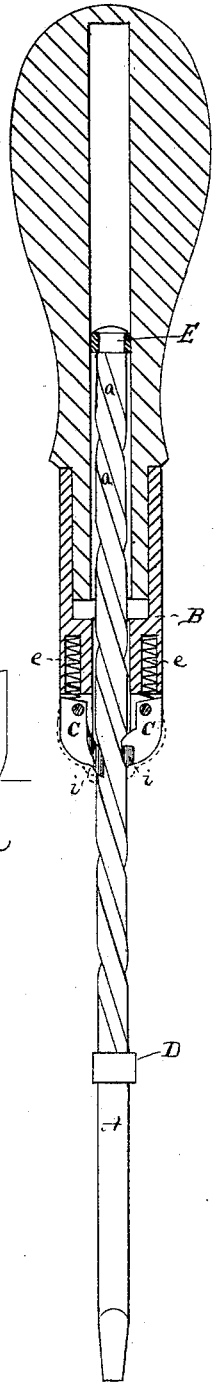
Figure 2:
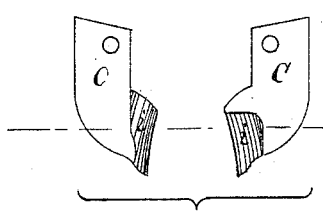
Figure 3:
Figure 4:
Figure 5:

Figure 1 is an elevation of my improved screw-driver with the handle in section, and shows the pawls in position. Fig. 2 is an enlarged view of the side of the pawls, and Fig. 3 is a view of the inner edge of one of the pawls. Fig. 4 is a cross-section of the shank. Fig. 5 is a cross-section of one of the pawls on line $x$, Fig. 2.

The object of my improvement in rotary screw-drivers is a construction whereby the blade and handle may be separated without rotating either part.

To this end the invention consists in making the shank with a spiral groove, and in attaching to the handle one or more pawls, as is hereinafter more fully described and explained.

To enable others to make my improved screw-driver, I will give a detailed description of the same.

The wood portion of the handle is in the usual form, and the ferrule B, fitting onto it, is elongated and perforated, and into the perforation the shank of the blade fits and freely moves. In its end a slot is made, into which the pawls C fit, and also holes into which the spiral springs $e$ are inserted for operating the pawls. The pawls C fit in the slot in the handle, and are beveled on their upper ends. Their lower ends are rounded to the form of the end of the ferrule, and on the inner sides are lugs or teeth, $i$, formed to fit into the grooves in the shank. The teeth $i$ are flat on their under surfaces, $h$, Fig. 5, and beveled on the upper faces, $g$, and fit in the grooves $a$ in the shank. The pawls are pivoted near the top and inner side, and the springs $e$, acting near the outer edges, force the pawls into the grooves $a$.

The shank A, Fig. 1, is made of a round rod of steel, and the lower end is flattened. The shank moves through the ferrule B, and has two rectangular spiral grooves, $a$, Fig. 4, in it, into which the teeth of the pawls move to rotate the blade. It has a collar at each end of the grooves, the lower collar being marked D and the latter E, to limit the sliding movement of the shank. When the pawls are at the lower end of the grooves, the lower collar prevents them from sliding over the blade, and the tool may then be used as the ordinary screw-driver.

Constructed and arranged as above described, the operation of the screw-driver is as follows: When the handle is pushed down, the teeth of the pawls engage with and rotate the blade, and when the handle is raised the pawls trip over the grooves without moving the blade.

Having described my improved screw-driver and its mode of operating, what I claim as new, and desire to secure by Letters Patent, is—

1. The ferrule B, slotted at its forward end, in combination with a pawl, C, pivoted in this slot, the spirally-grooved shank A, engaging with said pawl, and spring $e$, set into a recess of said ferrule and pressing against said pawl at the rear end thereof, substantially as set forth.

2. The ferrule B, slotted at its forward end, in combination with a pawl, C, pivoted in this slot, the spirally-grooved shank A, having a collar at the end of the groove, the groove of the former engaging with said pawl, and a spring, $e$, set into a recess of said ferrule and operating against the rear end of said pawl, substantially as set forth.

In testimony whereof I affix my signature in presence of two witnesses.

JOSEPH R. DOOLITTLE.

Witnesses:
 GEORGE TERRY,
 J. EDWARD LUDINGTON.